(12) United States Patent
Buettgen et al.

(10) Patent No.: US 10,295,657 B2
(45) Date of Patent: May 21, 2019

(54) TIME OF FLIGHT-BASED SYSTEMS OPERABLE FOR AMBIENT LIGHT AND DISTANCE OR PROXIMITY MEASUREMENTS

(71) Applicant: ams Sensors Singapore Pte. Ltd., Singapore (SG)

(72) Inventors: Bernhard Buettgen, Adliswil (CH); Jens Geiger, Thalwil (CH); Michael Kiy, Winterthur (CH); Oliver Chidley, Regensdorf (CH); Markus Rossi, Jona (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/689,079

(22) Filed: Aug. 29, 2017

(65) Prior Publication Data
US 2018/0059218 A1    Mar. 1, 2018

Related U.S. Application Data

(60) Provisional application No. 62/380,596, filed on Aug. 29, 2016.

(51) Int. Cl.
*G01K 1/08* (2006.01)
*G01S 7/483* (2006.01)
(Continued)

(52) U.S. Cl.
CPC .............. *G01S 7/483* (2013.01); *G01S 7/481* (2013.01); *G01S 7/497* (2013.01); *G01S 17/026* (2013.01); *G01S 17/36* (2013.01); *G01S 17/42* (2013.01)

(58) Field of Classification Search
CPC .......... G01J 3/00; G21K 1/043; H01J 49/025
See application file for complete search history.

(56) References Cited

U.S. PATENT DOCUMENTS

| 5,591,945 A * | 1/1997 | Kent | G06F 3/0418 178/18.04 |
| 2011/0043806 A1* | 2/2011 | Guetta | G01S 17/026 356/432 |

(Continued)

FOREIGN PATENT DOCUMENTS

WO    WO 2015/136100    9/2015

*Primary Examiner* — David P Porta
*Assistant Examiner* — Mamadou Faye
(74) *Attorney, Agent, or Firm* — Fish & Richardson P.C.

(57) ABSTRACT

A time of flight-based system is operable for ambient light measurements. A method of operation includes detecting, in at least one active demodulation detection pixel, a first particular wavelength and generating amplitude data of the first particular wavelength; and detecting, in at least one spurious reflection detection pixel, a second particular wavelength and generating amplitude data of the second particular wavelength. In a computational device that stores spectrum data corresponding respectively to a plurality of different ambient light source types, an ambient lighting condition is determined based on the amplitude data of the first particular wavelength, the amplitude data of the second particular wavelength and the spectrum data of a particular one of the ambient light source types associated with the amplitude data of the first particular wavelength and the amplitude data of the second particular wavelength.

14 Claims, 4 Drawing Sheets

(51) Int. Cl.
  *G01S 17/36* (2006.01)
  *G01S 7/497* (2006.01)
  *G01S 17/02* (2006.01)
  *G01S 7/481* (2006.01)
  *G01S 17/42* (2006.01)

(56) References Cited

U.S. PATENT DOCUMENTS

| | | |
|---|---|---|
| 2015/0340351 A1 | 11/2015 | Rossi et al. |
| 2015/0374245 A1 | 12/2015 | Szilagyi |
| 2016/0073954 A1 | 3/2016 | Meitav |
| 2018/0088681 A1* | 3/2018 | Zhou .................... G06F 1/1694 |

* cited by examiner

TIME OF FLIGHT-BASED SYSTEMS OPERABLE FOR AMBIENT LIGHT AND DISTANCE OR PROXIMITY MEASUREMENTS

CROSS-REFERENCE TO RELATED APPLICATION(S)

The present application claims the benefit of priority of U.S. Provisional Application No. 62/380,596, filed on Aug. 29, 2016. The entire contents of the earlier application are incorporated herein by reference.

FIELD OF THE DISCLOSURE

This disclosure relates to time of flight-based systems operable for ambient light and distance or proximity measurements.

BACKGROUND

Some handheld computing devices such as smart phones can provide a variety of different optical functions such as one-dimensional (1D) or three-dimensional (3D) gesture detection, 3D imaging, time-of-flight or proximity detection, ambient light sensing, and/or front-facing two-dimensional (2D) camera imaging.

Time-of-flight (TOF) sensors, for example, can be used to detect the distance to an object. In general, TOF systems are based on the phase-measurement technique of emitted intensity-modulated light, which is reflected by a scene. The reflected light is imaged onto a sensor, and the photo-generated electrons are demodulated in the sensor. Based on the phase information, the distance to a point in the scene for each pixel can be determined by processing circuitry associated with the sensor.

SUMMARY

This disclosure describes TOF-based systems operable for ambient light measurements and, in some cases, distance or proximity measurements.

In one aspect, for example, the disclosure describes a method that includes detecting, in at least one active demodulation detection pixel, a first particular wavelength and generating amplitude data of the first particular wavelength; and detecting, in at least one spurious reflection detection pixel, a second particular wavelength and generating amplitude data of the second particular wavelength. The method further includes determining, in a computational device that stores spectrum data corresponding respectively to a plurality of different ambient light source types, an ambient lighting condition based on the amplitude data of the first particular wavelength, the amplitude data of the second particular wavelength and the spectrum data of a particular one of the ambient light source types associated with the amplitude data of the first particular wavelength and the amplitude data of the second particular wavelength.

In another aspect, the disclosure describes a TOF-based optoelectronic system including at least one active demodulation detection pixel operable to detect a first particular wavelength and to generate amplitude data of the first particular wavelength; and at least one spurious reflection detection pixel operable to detect a second particular wavelength and to generate amplitude data of the second particular wavelength. Outputs of the at least one active demodulation detection pixel and the at least one spurious reflection detection pixel are communicatively coupled to a computational device. The computational device includes a computer storage medium storing spectrum data that corresponds, respectively, to a plurality of different ambient light source types. The amplitude data of the first particular wavelength and the amplitude data of the second particular wavelength are associated with spectrum data of a particular one of the ambient light source types. The computational device is operable to determine an ambient lighting condition based on the amplitude data of the first particular wavelength, the amplitude data of the second particular wavelength and the spectrum data of the particular one of the ambient light source types.

Some implementations include one or more of the following features. For example, the computational device can be operable to modify a component of the time-of-flight-based optoelectronic system based on the determined ambient lighting condition. The component can be, for example, a component of the computational device such as a display screen. In such implementations, the computational device can be operable to modify at least one of brightness or color temperature of the display screen based on the determined ambient lighting condition.

In some cases, the computational device is operable to identify the particular one of the ambient light source types based on a ratio of the amplitude data of the first and second particular wavelengths and based on the spectrum data of the particular one of the ambient light source types.

In some implementations, the at least one active demodulation detection pixel and the at least one spurious reflection detection pixel are operable to generate at least one of distance data or proximity data. In some cases, the time-of-flight-based optoelectronic system includes a first spectral filter disposed such that the first particular wavelength of the electromagnetic system is incident on the at least one active demodulation detection pixel, and further including a second spectral filter disposed such that the second particular wavelength of the electromagnetic system is incident on the at least one spurious reflection detection pixel. For example, the first particular wavelength can be 940 nm and the second particular wavelength can be 660 nm.

Other aspects, features and various advantages will be readily apparent from the following detailed description, the accompanying drawings, and the claims.

DETAILED DESCRIPTION

Figure 1:
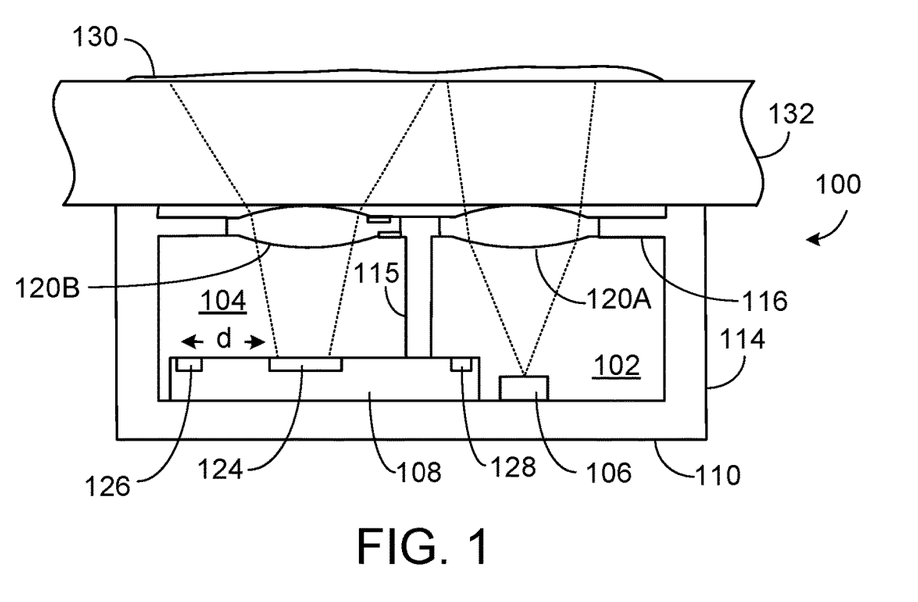
FIG. 1 illustrates an example of an optoelectronic module.

FIG. 1 illustrates an example of an optoelectronic module 100 that includes a light emission channel 102 and a light detection channel 104. A light emitter 106 (i.e., an illumination source) and a TOF sensor 108 are mounted on a first side of a printed circuit board (PCB) 110, which forms the bottom side of the module housing. The light emitter 106 can be operable to generate coherent, directional, spectrally defined light emission with minimal divergence relative to the emission axis (e.g., in the range of 10 to 20 degrees). Examples of the light emitter 106 are a laser diode or a vertical cavity surface emitting laser (VCSEL).

A spacer 114 is attached to the first side of the PCB 110 and separates the PCB 110 from an optics member 116. The spacer 114 can be composed of a material (e.g., epoxy resin) and have a thickness such that it is substantially non-transparent to wavelengths of light detectable by the TOF sensor 108. An interior wall 115 of the spacer 114 provides optical isolation between the module's two chambers (i.e., the light emission chamber (channel) 102 and the light detection chamber (channel) 104).

The optics member 116 includes a respective passive optical element (e.g., a lens) 120A, 120B for each channel 102, 104. Light from the emitter 106 is directed out of the module 100 and, if reflected by an object back toward the module's detection channel 104, can be sensed by the TOF sensor 108.

The TOF sensor 108 includes an array of spatially distributed light sensitive elements (e.g., pixels), as well as logic and other electronics to read and process the pixel signals. The pixels can be implemented, for example, in a single integrated semiconductor chip (e.g., a CCD or CMOS sensor). The emitter 106 and the TOF sensor 108 can be connected electrically to the PCB 110, for example, by conductive pads or wire bonds. The PCB 110, in turn, can be connected electrically to other components within a host device (e.g., a smart phone). The TOF sensor 108 is operable to resolve distance based on the known speed of light by measuring the time-of-flight of a light signal between the sensor and the subject for each point of an object. The circuitry in the TOF sensor 108 can use signals from the pixels to calculate, for example, the time the light has taken to travel from the emitter to an object of interest and back to the focal plane array.

The TOF sensor 108 can be implemented, for example, as an integrated sensor chip. As shown in FIG. 1, the TOF sensor 108 includes active demodulation detection pixels 124, one or more dedicated "spurious reflection detection" pixels 126 and one or more reference pixels 128. Although the number and arrangement of the demodulation detection pixels 124 can vary depending on the implementation, in some implementations, the demodulation detection pixels are in a 3×3 array. In some cases, the spurious-reflection detection pixels may be referred to as smudge detection pixels. Each spurious-reflection detection pixel 126 can be implemented, for example, as a CCD pixel or a photodiode. The demodulation detection pixels 124 provide the primary signals for determining the proximity of an object outside the module. The demodulation detection pixels 124 preferably are centered below the light detection channel lens 120B. The center optical emission axis of the emitter 106 preferably is aligned with the emitter channel lens 120A. Signals sensed by the spurious-reflection detection pixel(s) 126 can be used to correct for spurious reflections such as from a smudge (i.e., a blurred or smeared mark such as a fingerprint or dirt) 130 on the transmissive cover (e.g., a cover glass) 132 of a host device (e.g., a smart phone or other handheld computing device). In some implementations, signals sensed by the spurious-reflection detection pixel(s) 126 can be used to correct for spurious reflections resulting from other direct reflections such as from the cover glass, from a filter, or from other optical/non-optical components in the optoelectronic module or host device. If such corrections are not performed, the TOF sensor may produce a spurious output signal, which can compromise the accuracy of the proximity data collected. A small amount of light from the emitter 106 can be reflected, for example, by the lens 120A back toward the reference pixel(s) 128. Signals from the reference pixel(s) 128 can be used to compensate for thermal drift and/or to provide a zero distance measurement.

The sensor's processing circuitry can be implemented, for example, as one or more integrated circuits in one or more semiconductor chips with appropriate digital logic and/or other hardware components (e.g., read-out registers; amplifiers; analog-to-digital converters; clock drivers; timing logic; signal processing circuitry; and/or a microprocessor). The processing circuitry may reside in the same semiconductor chip as the sensor 108 or in one or more other semiconductor chips.

In the example of FIG. 1, an interior wall 115 of the spacer 114 provides optical isolation between the module's two chambers (i.e., the light emission channel 102 and the light detection channel 104). The reference pixel(s) 128 are located in the emitter chamber 102, whereas the demodulation detection pixels 124 and the dedicated spurious-reflection detection pixel(s) 126 are located in the detection chamber 104. The interior wall 115 prevents emitter light, which is reflected, for example, back into the emission chamber 102 by the lens 120A, from impinging on the demodulation detection pixels 124.

In some of the examples described here, it is assumed that spurious reflections may be caused by a smudge on the cover glass of the host device. However, the modules and techniques described below also can be applicable to spurious reflections resulting from other direct reflections such as from the cover glass, from a filter, or from other optical/non-optical components in the optoelectronic module or host device.

In some cases, the spurious-reflection detection pixel(s) 126 is positioned relative to the demodulation detection pixels 124 such that, in the absence of a smudge on cover 132 of the host device, the spurious-reflection detection pixel 126 senses, at most, a signal representing only a relatively low optical intensity of light reflected by an object in a scene outside the module 100. In contrast, when a smudge 130 is present on the surface of the cover 132 of the host device, the smudge may redirect some of the light reflected by the external object toward the spurious-reflection detection pixel(s) 126 such that they sense a significantly higher optical intensity. For example, the spurious-reflection detection pixel 126 can be positioned on the sensor 108 a sufficient lateral distance (d) from the demodulation detection pixels 124 such that, in the absence of a smudge on cover 132 of the host device, the spurious-reflection detection pixel 126 senses, at most, only a relatively low optical intensity of light reflected by an object in a scene outside the module 100. On the other hand, a smudge 130 on the surface of the cover 132 of the host device can cause some of the light reflected by the external object to be redirected toward the spurious-reflection detection pixel 126 such that it senses a significantly higher optical intensity.

Figure 2:
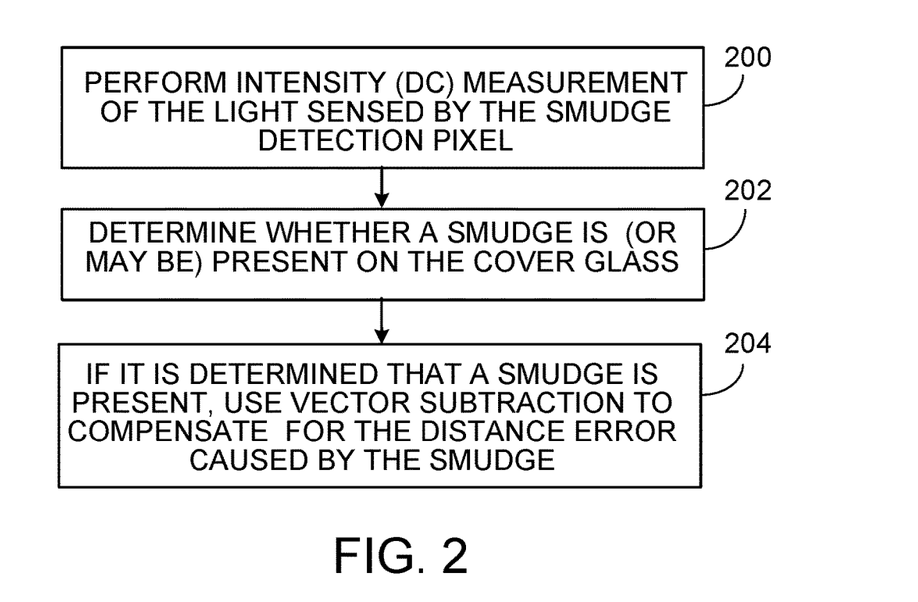
FIG. 2 is a flow chart illustrating a method of compensating for spurious reflections.

The optical intensity sensed by the spurious-reflection detection pixel 126 can be used by the sensor's processing circuitry to determine whether a smudge is present on the cover glass 132 and to determine how much light (i.e., amplitude and phase) collected by the active pixels 124 results from the smudge rather than the object of interest. For example, as illustrated by FIG. 2, during each TOF frame, the sensor's control circuitry can initiate an intensity (DC) measurement of the light sensed by the spurious-reflection detection pixel 126 (block 200). Based at least in part on the output of the spurious-reflection detection pixel, the sensor's processing circuitry then can determine whether a smudge is present on the cover glass 132 (block 202). In particular, in some implementations, a high intensity sensed by the spurious-reflection detection pixel 126 in combination with a TOF sensor output of about zero (i.e., cover glass level) indicates the presence of an object on the surface of the cover glass 132. On the other hand, a high intensity sensed by the spurious-reflection detection pixel 126 in combination with a TOF measurement greater than zero indicates the presence of a smudge. Further, the intensity sensed by the spurious-reflection detection pixel 126 is proportional to the magnitude of the smudge vector. As the phase of the smudge vector is available to the sensor's processing circuitry, the processing circuitry can use vector subtraction to compensate for the distance error caused by the smudge (block 204). For example, the intensity of the light reflected by the smudge 130 can be measured by the spurious reflection pixel 126. Assuming that the path length to the smudge 130 is known to the sensor's processing circuitry, the phase also can be determined (e.g., as part of a calibration process). If the magnitude of the light on the spurious-reflection detection pixel 126 is known, the magnitude of the light component incident on the active pixels 124 that is a result of reflection from the smudge 130 can be inferred, e.g., by the sensor's processing circuitry. The phase of the light component that is a result of the reflection from the smudge 130 can be factored out of the measured signals obtained from the active pixels 124.

Figure 3:
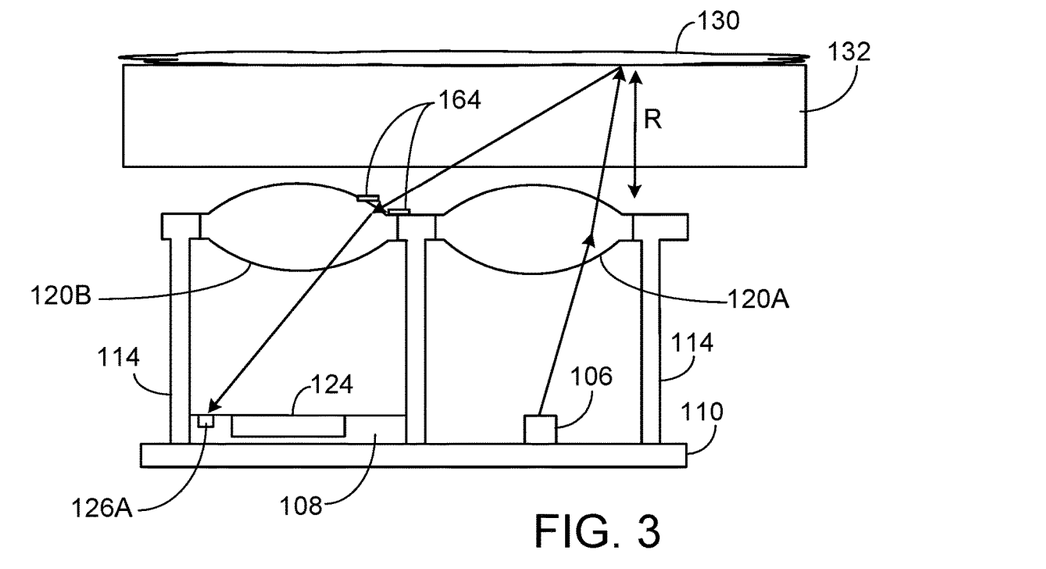
FIG. 3 illustrates a further example of an optoelectronic module.

In some implementations, the module includes pixels that serve as combined reference and spurious-reflection detection pixels. An example is illustrated in FIG. 3, which includes one or more pixels 126A whose output can be used by the sensor's processing circuitry to correct for spurious reflections such as from a smudge and also to compensate for thermal drift/or and to provide a zero distance measurement. For example, signals from the pixels 126A can be used to determine both amplitude and phase during calibration of the module. During subsequent operation, changes in amplitude of the detected signals of the pixels 126A can indicate the presence of the smudge and can be used to correct for spurious reflections caused by the smudge. Likewise, phase shifts in the detected signals of the pixels 126A can be used to compensate for thermal drift.

In some implementations, instead of, or in addition to, dedicated spurious-reflection detection (i.e., smudge) pixels, signals obtained from the demodulation detection pixels 124 can be used to determine the wave component (i.e., amplitude, phase) that is caused by reflection from a smudge 130 on the surface of the cover glass 132. To do so, the wave component caused by the smudge reflection can be estimated, for example, by repeating measurements at two different modulation frequencies. Assuming the distance between the smudge 130 and the emitter 106 is known to the module's processing circuity (e.g., based on a previously stored value in memory and/or calibration of the module), the additional wave component resulting from the presence of the smudge 130 can be determined by the processing circuity. Any such additional wave component would be common to signals detected by the demodulation detection pixels 124 at both modulation frequencies. The additional wave component caused by the smudge 130 can be eliminated (i.e., subtracted out) through known vector manipulation techniques, and the wave components resulting from light reflected by the object of interest outside the module can be calculated. The resulting phase shift then can be used to calculate the distance to the object 135.

Figure 4:
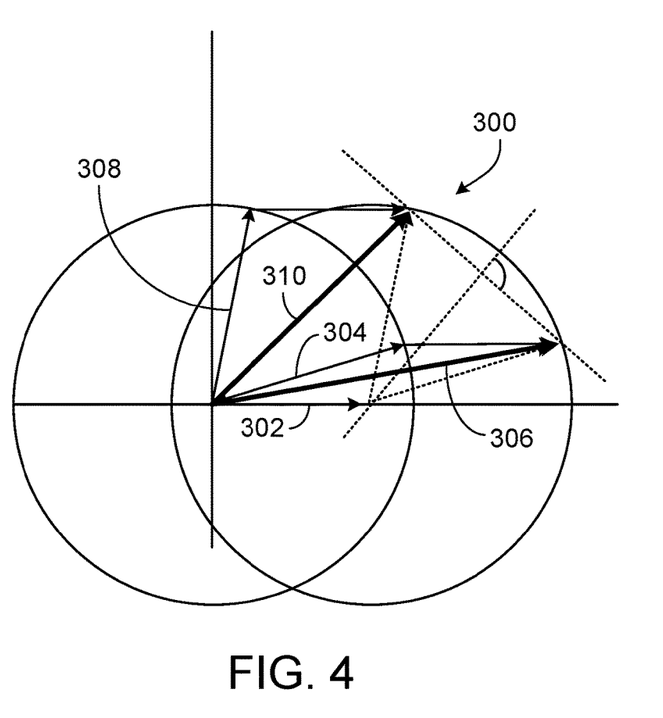
FIG. 4 is an example of a phasor diagram based on measurements using two different modulation frequencies.

FIG. 4 is an example of a phasor diagram 300 illustrating the various light components in which two different modulation frequencies are used as described above. In FIG. 4, 302 is the wave component (i.e., vector representing amplitude, phase) caused by reflection from the smudge, 304 is the wave component caused by light reflected from the object at the low modulation frequency, 306 is the wave component that represents the sum of the light reflected both by the object and by the smudge at the low modulation frequency, 308 is the wave component caused by light reflected from the object at the high modulation frequency, and 310 is the wave component that represents the sum of the light reflected both by the object and by the smudge at the high modulation frequency. The wave components (i.e., phasors) 302, 304, 306, 308 and 310 in FIG. 4 are rotated by a phase corresponding to the known distance of the smudge measured at the respective modulation frequency. In the phasor diagram 300, the two phasors 306, 310 (representing the received light signal at low and high demodulation frequencies, respectively) lie on a circle whose center corresponds to the amplitude of the smudge component. Thus, vector manipulation can be used to eliminate the wave component caused by the smudge. The foregoing vector manipulation to eliminate the wave component caused by the smudge can be performed by the sensor's processing circuitry or by control circuitry of a host device in which the module is disposed.

TOF-based systems such as those described above can be used to determine ambient light conditions. In some implementations, the TOF-based system 100 is operable to detect a particular wavelength (e.g., 940 nm) of the electromagnetic spectrum via the active the demodulation detection pixels 124 and the one or more dedicated spurious reflection detection pixels 126. In other implementations, the active demodulation detection pixels 124 are operable to detect a first particular wavelength (e.g., 940 nm) and the one or more dedicated spurious reflection detection pixels 126 are operable to detect a second different particular wavelength of the electromagnetic spectrum (e.g., 660 nm). For example, a first spectral filter can be disposed such that the first wavelength is incident on the active demodulation detection pixel(s) 124, and a second spectral filter can be disposed such that the second wavelength is incident on the spurious reflection detection pixel(s). The respective amplitudes of the particular wavelengths then can be determined, for example, as described above.

Figure 5:
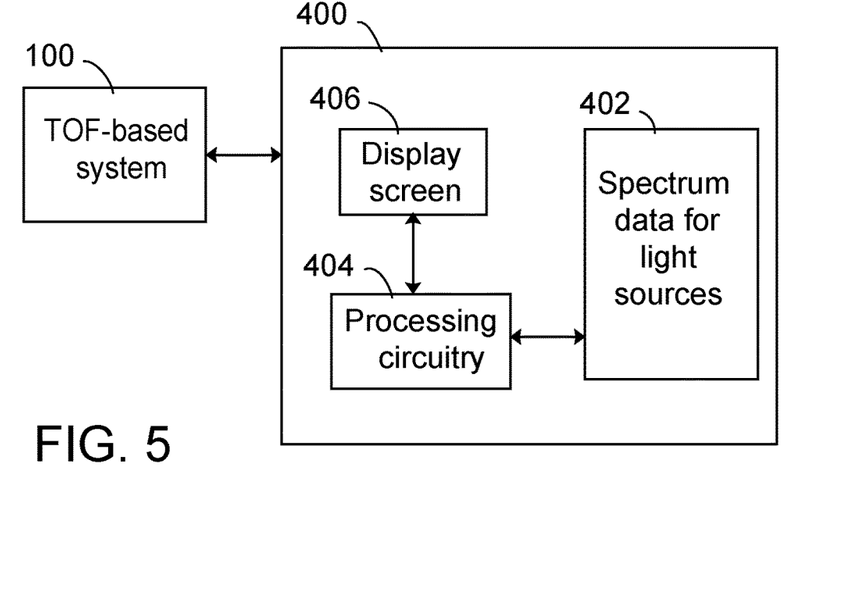
FIG. 5 illustrates an example of TOF-based system communicatively coupled to a a computational device.

As shown in FIG. 5, the TOF-based system 100 can be communicatively coupled to a computational device (e.g., a smartphone, a laptop computer, a tablet computer, a personal digital assistants ("PDA") or other computational device) 400. Spectrum data of multiple light source types (e.g., the sun, fluorescent, incandescent, and/or gas-discharge lamps) can be stored on the computational device. For example, such spectrum data can be encoded on a computer storage medium 402 such as a computer-readable storage device, a computer-readable storage substrate, a random or serial access memory array or device, or a combination of the aforementioned. Processing circuitry 404 in the computational device 400 is operable to compare the amplitude of the particular wavelength of light to the stored spectrum data (see FIG. 6, block 500). In some cases, a user of the computational device provides user input (e.g., via an interactive user interface of the device 400) to specify or select a particular ambient light source type whose stored spectrum data is to be used for the comparison. For example, a user may select a solar spectrum if the user is operating the computational device 400 outdoors. As another example, the user may select spectrum data of a particular light source type (e.g., mercury-vapor lamp) if the user knows she is operating the computational device indoors in the vicinity of that particular type of light source. Once the user selects the particular light source type, the processing circuitry 404 can use the amplitude data to deduce the ambient lighting conditions (e.g., intensity and color temperature) (FIG. 6, block 502).

Figure 7:
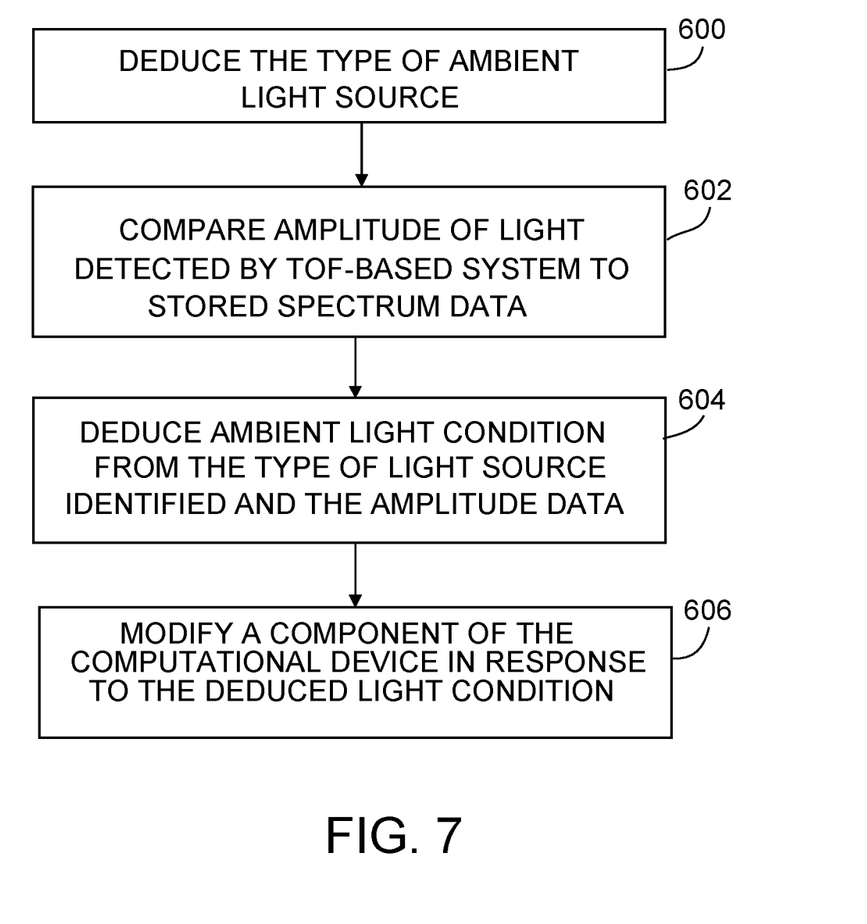
FIG. 7 is a flow chart of another method for modifying a component of a computational device based on an ambient light condition.

In some implementations, such as implementations in which the active demodulation detection pixels 124 and the one or more dedicated spurious reflection detection pixels 126 respectively detect different particular wavelengths of light, the amplitude of both wavelengths (e.g., their ratio) can be used by the processing circuitry 400 to deduce the particular ambient light source type (see FIG. &, block 600) even without user input specifying the ambient light source type. The processing circuitry 404 then compares the amplitudes (e.g., ratio) of the particular wavelengths of light to the specified spectrum data (block 602) and deduces the ambient lighting conditions (e.g., intensity and color temperature) based on the stored solar spectrum corresponding to the particular ambient light source type and from the amplitudes of the particular wavelengths (block 604).

Figure 6:
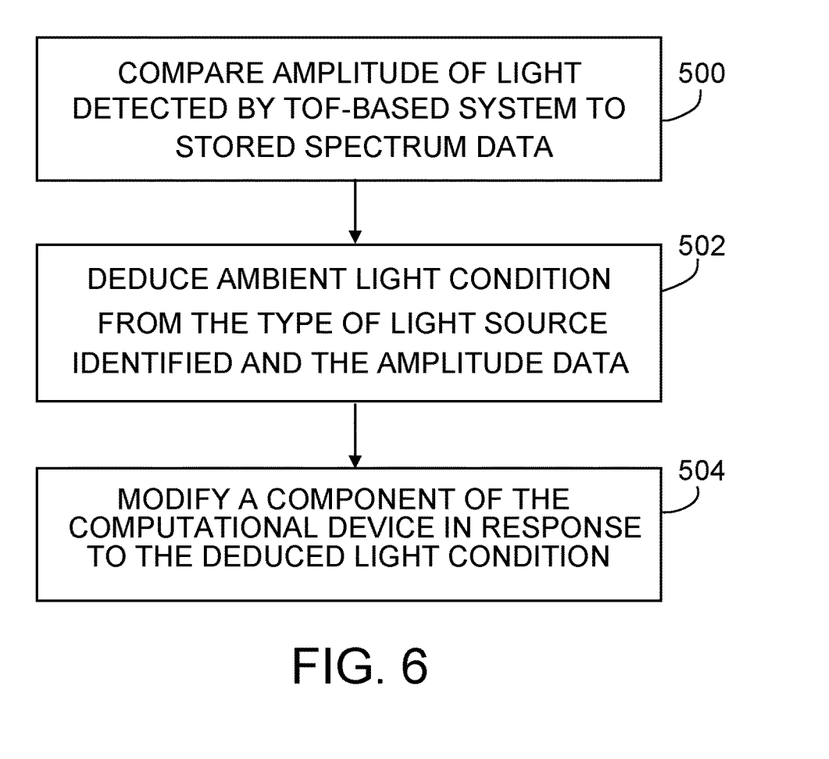
FIG. 6 is a flow chart of a method for modifying a component of a computational device based on an ambient light condition.

The deduced ambient lighting conditions can be used to modify various components of the computational device (see FIG. 6, block 504 and FIG. 7, block 606). For example, if the computational device includes a display screen (406 in FIG. 5), the appearance of the display screen (e.g., the display screen brightness and the color temperature) can be optimized for the ambient lighting conditions. Such optimization can be initiated by the processing circuitry 400 automatically in response to determining the ambient lighting conditions.

In some implementations, the TOF-based systems described above also are operable to determine proximity or distance to objects. For example, the TOF-based system 100 can be operable to detect light reflected from objects via active demodulation detection pixels 124, and the amplitude of the reflected light can be determined as described above. In some instances, the amplitude corresponds to the proximity of the object. For example, the amplitude may be relatively large when the object is in close proximity and may be smaller when the object is further away. The processing circuitry 404 of the computational device 400 can use the distance and/or proximity information to modify various components of the computational device in conjunction with the deduced ambient lighting conditions. For example, in some instances the distance and/or proximity data can be used to determine whether an object is in close proximity to the computational device. In such situations, amplitude data collected by the active demodulation detection pixels 124 and/or the one or more dedicated spurious reflection detection pixels 126 need not be used to deduce ambient lighting conditions since the data may not accurately reflect ambient lighting conditions; accordingly, computational resources and power may be conserved.

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a smartphone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of implementations have been described. Nevertheless, various modifications may be made without departing from the spirit of the invention. Accordingly, other implementations are within the scope of the claims.

What is claimed is:

1. A time-of-flight-based optoelectronic system comprising:
   at least one active demodulation detection pixel operable to detect a first particular wavelength, and being further operable to generate amplitude data of the first particular wavelength;
   at least one spurious reflection detection pixel operable to detect a second particular wavelength, and being further operable to generate amplitude data of the second particular wavelength;
   outputs of the at least one active demodulation detection pixel and the at least one spurious reflection detection pixel being communicatively coupled to a computational device;
   the computational device including a computer storage medium storing spectrum data that corresponds, respectively, to a plurality of different ambient light source types, wherein the amplitude data of the first particular wavelength and the amplitude data of the second particular wavelength are associated with spectrum data of a particular one of the ambient light source types,
   wherein the computational device is operable to identify the particular one of the ambient light source types based on a ratio of the amplitude data of the first and second particular wavelengths and based on the stored spectrum data.

2. The time-of-flight-based optoelectronic system of claim 1 further including a component, wherein the computational device is operable to modify the component based on the identified one of the ambient light source types.

3. The time-of-flight-based optoelectronic system of claim 1 wherein the computational device includes a component, wherein the computational device is operable to modify the component based on the identified one of the ambient light source types.

4. The time-of-flight-based optoelectronic system of claim 3 wherein the component of the computational device is a display screen.

5. The time-of-flight-based optoelectronic system of claim 4 wherein the computational device is operable to modify at least one of brightness or color temperature of the display screen based on the identified one of the ambient light source types.

6. The time-of-flight-based optoelectronic system of claim 1 wherein the at least one active demodulation detection pixel and the at least one spurious reflection detection pixel are operable to generate at least one of distance data or proximity data.

7. The time-of-flight-based optoelectronic system of claim 1 further including a first spectral filter disposed such that the first particular wavelength of the electromagnetic system is incident on the at least one active demodulation detection pixel, and further including a second spectral filter disposed such that the second particular wavelength of the electromagnetic system is incident on the at least one spurious reflection detection pixel.

8. The time-of-flight-based optoelectronic system of claim 7 wherein the first particular wavelength is 940 nm and the second particular wavelength is 660 nm.

9. The time-of-flight-based optoelectronic system of claim 1 further including:
   a first light source operable to generate modulated electromagnetic radiation of the first particular wavelength; and
   a second light source operable to generate modulated electromagnetic radiation of the second particular wavelength.

10. A method comprising:
    detecting, in at least one active demodulation detection pixel, a first particular wavelength and generating amplitude data of the first particular wavelength;
    detecting, in at least one spurious reflection detection pixel, a second particular wavelength and generating amplitude data of the second particular wavelength;
    identifying, in a computational device that stores spectrum data corresponding respectively to a plurality of different ambient light source types, a particular one of the ambient light source types based on a ratio of the amplitude data of the first particular wavelength and the amplitude data of the second particular wavelength and based on the stored spectrum data.

11. The method of claim 10 including modifying a component based on the identified one of the ambient light source types.

12. The method of claim 10 including modifying a component of the computational device based on the identified one of the ambient light source types.

13. The method of claim 10 including modifying a display screen of the computational device based on the identified one of the ambient light source types.

14. The method of claim 10 including modifying at least one of brightness or color temperature of the display screen based on the identified one of the ambient light source types.

* * * * *